April 14, 1936.  M. A. WAGONER  2,037,491
STRAW SAVING DEVICE FOR COMBINES
Filed Jan. 15, 1935  2 Sheets-Sheet 1
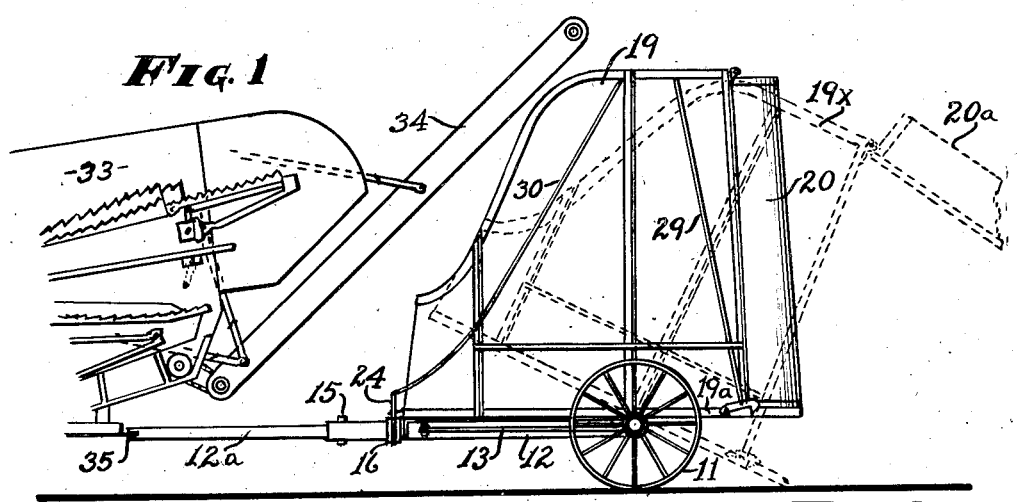
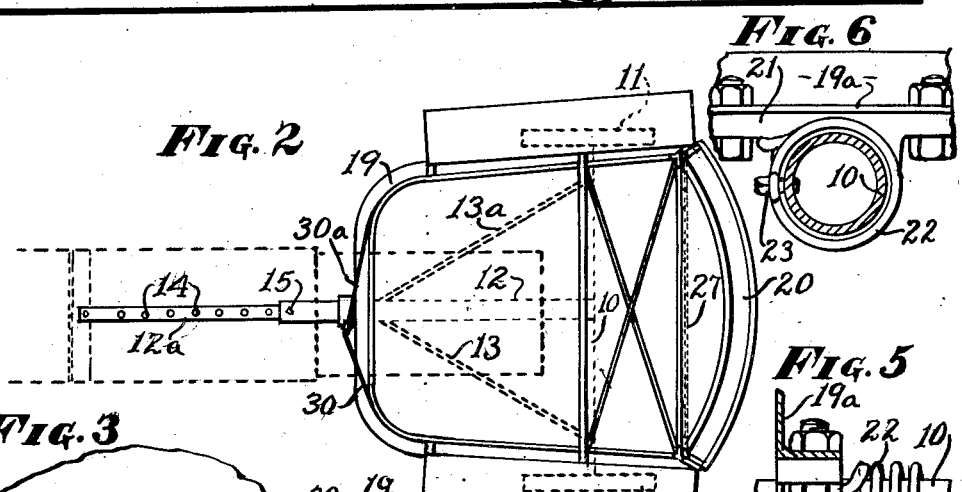
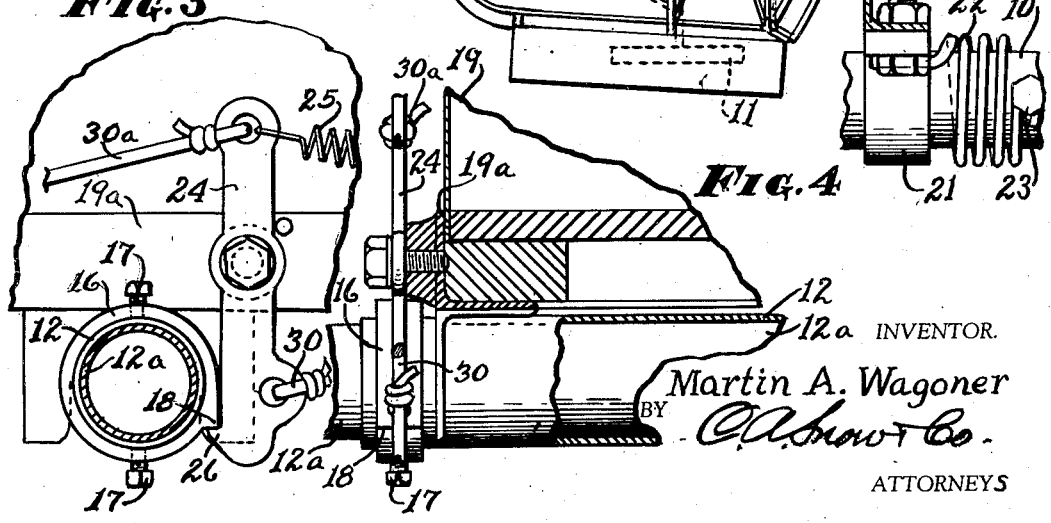
INVENTOR.
Martin A. Wagoner
BY
ATTORNEYS April 14, 1936.  M. A. WAGONER  2,037,491
STRAW SAVING DEVICE FOR COMBINES
Filed Jan. 15, 1935  2 Sheets-Sheet 2
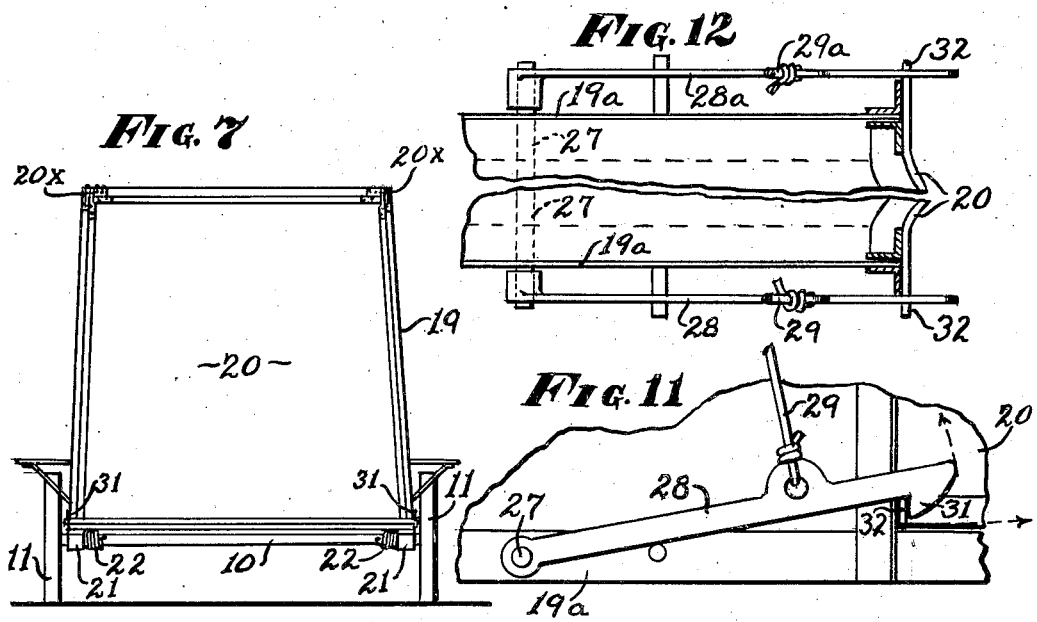
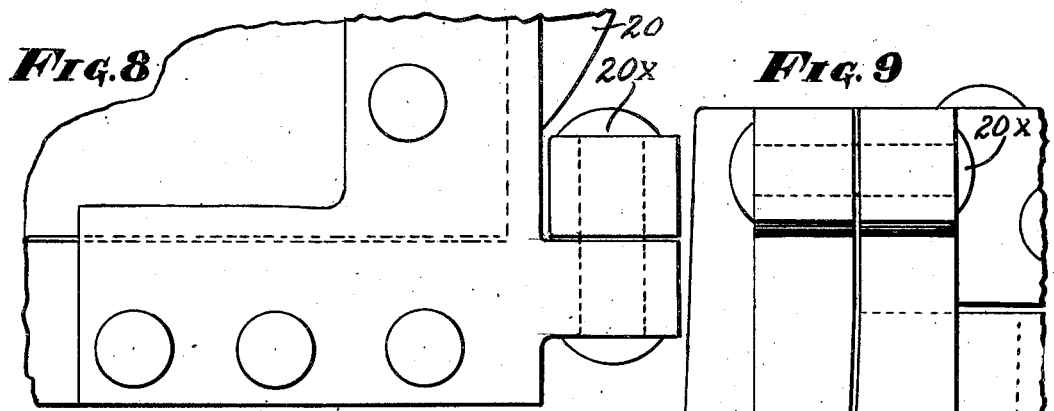
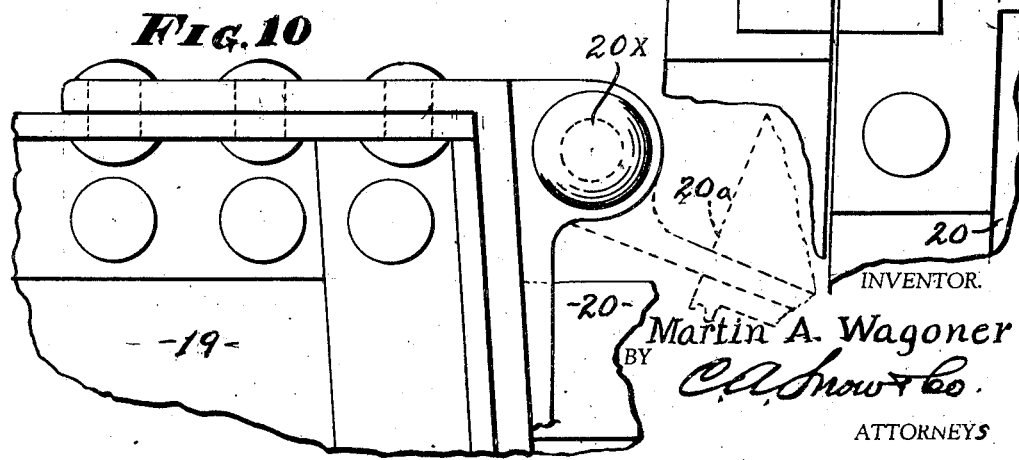
INVENTOR.
Martin A. Wagoner
BY
ATTORNEYS Patented Apr. 14, 1936

2,037,491

UNITED STATES PATENT OFFICE 2,037,491

STRAW SAVING DEVICE FOR COMBINES

Martin A. Wagoner, Sheridan County, Kans.

Application January 15, 1935, Serial No. 1,881

3 Claims. (Cl. 56—401)

This invention relates to a device which may be trailed behind a harvester-thresher for receiving and transporting the straw as discharged from the straw racks of the combine; so that when the device has filled with straw then the straw may be discharged therefrom in the form of a neat shock.

The object of my invention is to provide a device that will perform the operation just mentioned by tilting the body of the device rearwardly to discharge the straw. A still further object is to provide a device of the kind mentioned that will be tilted to a discharge position by gravity, due to the weight of the straw contained in said device. Another object is to provide a device of the kind mentioned, the body of which will return to its normal position due to the action of gravity after the straw has been discharged therefrom. A still further object is to provide a device of the kind mentioned, the tilting action of the body and the opening of the rear door being controlled by a system of catches by which the time of dumping the contents of the body may be determined by the operator. These and other objects will be more fully explained as this description progresses.

In the drawings; Fig. 1 is a side view of my device showing it attached to the rear of a combine harvester for the purposes previously described. Fig. 2 is a plan view of Fig. 1. Fig. 3 is an enlarged detail view of the catch mechanism governing the dumping of the body. Fig. 4 is a side view of Fig. 3, parts of which are shown in section for convenience of illustration. Fig. 5 is a detail view of one of the bearings that supports the body and also showing a spring mechanism that may be employed in causing the body to tilt back to its normal horizontal position. Fig. 6 is a view looking in from the right side of Fig. 5. Fig. 7 is a rear view of the device. Fig. 8 is a plan view of one of the rear corners showing the hinged device on which the rear door is swung. Fig. 9 is a view of Fig. 8 as seen from the rear of the machine. Fig. 10 is a view of Fig. 8 as seen from the side of the machine. Fig. 11 is a side view of the latch device employed in controlling the opening of the rear door. Fig. 12 is a plan view of Fig. 11.

Similar numerals of reference indicate corresponding parts throughout all of the figures of the drawings.

Referring to the drawings; a vehicle is seen including an axle 10 carried on wheels 11. At 12 is a tubular tongue element rigidly attached to the axle 10 and held at right angles thereto by radius rods 13 and 13a which are attached to the axle 10 and the tongue member 12. At 12a is a second tubular tongue member which is slipped inside of the tongue element 12 and is provided with a series of holes 14 to receive a bolt 15 which may be passed through the tongue elements 12 and 12a, thereby providing means for adjusting the length of the tongue assembly.

On the tongue element 12, Fig. 3, is a collar 16 which is rigidly attached thereto by means of set screws 17, the collar 16 being provided with a lip 18 for purposes that will be later explained. At 19 is a body element, the sides and front end of which are tapered so as to form a container that is larger at the bottom than at the top, and at the rear of the container is a door element 20, which also sets in an inclined position as shown and is hinged at the top corners thereof to the top corners of the container, as seen at 20x.

The container is carried on bearings 21 that are revolvably mounted on the axle 10, and at 22 is a helical spring enveloping the axle 10, one end of said spring being rigidly attached to the axle 10 by having one end of said spring being turned around a bolt 23 that is threaded into the axle 10. The opposite end of the spring 22 being hooked under the bearing element 21 so that the tension of the spring 22 will tend to revolve the bearing 21 to rock the container 19 to its normal horizontal position.

Pivotally mounted on the front of the container is a catch 24 that is tensioned by a spring 25 so as to cause the hook portion 26 of the catch to engage the lug 18 on the collar 16 and thereby hold the body 19 in a horizontal position. At 30 and 30a are ropes or cables which are attached to the latch element 24 and lead to any suitable place, for instance to the operator's platform on the combine, from where the latch may be released from the collar 16. At 27 is a rod pivotally mounted in the angle iron frame element 19a and extending across the width of the container 19 and on the ends thereof are rigidly mounted a pair of latch members 28 and 28a, which are operable by means of a rope or cable 29 or 29a which are attached to the elements 28 and 28a and lead to any suitable place from which the latch may be operated. At the outer ends of the elements 28 and 28a are hook members 31 which are adapted to hook over a projecting portion 32 on the bottom edge of the door element 20. This arrangement functions to hold the gate 20 in a closed position until it is desired to allow the gate to open whereupon the latches 29 and 29a will release the gate for opening purposes as will be later explained.

Referring to Fig. 1 is shown the rear rack portion 33 of a harvester-thresher to which is attached an auxiliary elevator mechanism 34 that is driven from the power from the harvester machine and is adapted to discharge straw received from the racks and chaffer into the container 19.

The operation of my device is as follows: The tongue of the vehicle is attached as indicated at 35 to the combine harvester, and as the harvester travels down the field, straw being discharged from the harvester is caught on the elevator 34 and discharged from the top end thereof, so that the straw falls into the container 19. This operation continues until the container has been filled with straw, the major portion of which is positioned rearward of the axle 10, then by the pulling of the ropes 29 and 30, the latches 28 and 28a are raised, thereby releasing the door 20 so that it may swing open and also releasing the latch 26 from the shoulder 18 whereupon, due to the action of gravity the body or container 19 will rock to the dotted position 19x, whereupon the contents of the container will slip rearwardly from the container and push the door 20 to the dotted position 20a and the contents of the container 19 is then deposited on the ground, after which the body 19, due to the action of gravity and the assistance of the spring 22 will be rocked to its normal horizontal position and the door 20 will slam to its closed position, where it will be held by the latch elements and the latch element 26 will catch under the lug 18 and function to hold the body 19 in its normal horizontal position, whereupon the body or container 19 again receives straw being discharged from the elevator 34 and the operation just described may be again repeated.

Due to the tapering shape of the container 19, it is obvious that each movement made by the straw is in a direction away from the sides of the container, therefore the straw will not bind against the sides of the container and will be easily discharged therefrom, also the shock of straw discharged from the container will have a tapered form which lends to the substantiability of the shock after it has been discharged from the container.

Such modifications of my invention may be employed as lie within the scope of the appended claims without departing from the spirit and intention of my invention. Having fully described my invention what I claim as new and desire to secure by Letters Patent is:

1. A thrashed straw shocking device comprising a vehicle, a container comprising a floor, a forward wall, a pair of side walls and a door hinged at the rear of said walls and closable at its base against the floor of the container, said container being pivotally mounted on the chassis of the vehicle; and latch means for normally supporting the container against pivotal movements and other latch means for normally maintaining closure of said door, and means associated with said latch means for breaking locked latch connections for permitting a gravity discharge through the door passage.

2. A thrashed straw shocking device comprising a vehicle, a container comprising a floor, a forward wall, a pair of side walls and a door hinged at the rear of said walls and closable at the base against the floor of the container, said container being pivotally mounted on the chassis of the vehicle; and latch means for normally supporting the container against pivotal movements, and other latch means for normally maintaining closure of said door and means associated with said latch means for breaking locked latch connections for permitting a gravity discharge through the door passage; and spring means carried by the vehicle tending to occasion a return of the container and door to its normal receiving position.

3. A thrashed straw shocking device comprising a vehicle, a container comprising a floor, a forward wall, a pair of side walls and a door hinged at the rear of said walls and closable at the base against the floor of the container, said container being pivotally mounted on the chassis of the vehicle in such a manner that the container will tip rearwardly by gravity when loaded and will return to its normal position when unloaded; and latch means for normally supporting the container against pivotal movements, and other latch means for normally maintaining closure of said door and means associated with said latch means for breaking locked latch connections for permitting a gravity discharge through the door passage.

MARTIN A. WAGONER.